UNITED STATES PATENT OFFICE.

BRUCE C. DAVEY, OF CHICAGO, ILLINOIS.

CEMENT.

1,253,011.  Specification of Letters Patent.  Patented Jan. 8, 1918.

No Drawing.   Application filed March 11, 1916.  Serial No. 83,565.

*To all whom it may concern:*

Be it known that I, BRUCE C. DAVEY, a citizen of the United States, residing at Chicago, in the county of Cook and State of Illinois, have invented a new and useful Improvement in Cement, of which the following is a specification.

My invention relates to oxychlorid cement for use, more particularly, in forming the "scratch", or foundation, coat of cement walls, or the like, one of the more particular uses to which my invention is placed being that of forming exterior stucco-surfacings for walls of buildings.

My objects, generally stated, are to provide an improved cement for the purposes above stated which shall be relatively inexpensive, of relatively light weight and present a high degree of elasticity, whereby a wall, or partition, or surface-coating formed therefrom, will not crack when subjected to unequal or non-uniform stresses to which structures of this character under different conditions of use and weather, are subjected.

My improved cement, as I prefer to make it, consists of a mixture of calcined magnesite, long- and short-fiber asbestos, sand, chlorid of magnesium and granulated cork. It is preferred that the calcined magnesite, asbestos, cork and sand be thoroughly mixed together and when it is desired to use the cement, to add thereto a solution of chlorid of magnesium, causing the mass to become plastic and in suitable condition for applying to use.

In the making of the cement I prefer to provide the different ingredients in the proportions as follows:

500 pounds calcined magnesite;
100 pounds short-fiber asbestos;
32 pounds long-fiber asbestos;
1068 pounds sand, preferably white glass sharp sand;
300 pounds granulated cork of about 20 mesh.

The ingredients above stated are preferably thoroughly mixed together in any suitable form of mixer, the mixture thus provided being dry. When the cement is to be used, there is added to the mixture just referred to 160 gallons of a solution of water and chlorid of magnesium, mixed in such proportions as to cause the solution of chlorid of magnesium to have a specific gravity of about 20 Baumé. All of the ingredients above stated are thoroughly mixed together in a mixing-box and the cement thus produced and in plastic condition is ready to be applied to use, the cement becoming set by subjection to the atmosphere.

The admixture of the cork with the other ingredients is very advantageous from a practical standpoint. It not only serves to furnish body to the mass, without impairing its efficiency, with the result of greatly reducing the cost of the cement and reducing its weight, but causes the mass to present a high degree of elasticity, enabling a wall or surfacing formed of the cement, to adapt itself without cracking, to unequal and non-uniform stresses to which the wall or surfacing may be subjected.

The effect of the short fiber asbestos is to make the composition "fatty" and cause it to be worked easily, while the long fiber asbestos acts as a binder.

What I claim as new and desire to secure by Letters Patent is:—

1. A new composition of matter comprising calcined magnesite, long- and short-fiber asbestos, the latter in sufficient quantity to make it work easy, chlorid of magnesium and particles of cork of about 20 mesh.

2. A new composition of matter comprising calcined magnesite, sand, long- and short-fiber asbestos, the latter in sufficient quantity to make it work easy, chlorid of magnesium and particles of cork of about 20 mesh.

BRUCE C. DAVEY.